(12) United States Patent
Davis et al.

(10) Patent No.: US 6,533,885 B2
(45) Date of Patent: Mar. 18, 2003

(54) APPARATUS AND METHOD FOR MANUFACTURING A SHOE UPPER

(75) Inventors: Paul M. Davis, Blackstone, MA (US); Jon E. Tripp, Sr., Bridgewater, MA (US); Paul N. Beaulieu, Beverly, MA (US)

(73) Assignee: Reebok International Ltd., Canton, MA (US)

( * ) Notice: Subject to any disclaimer, the term of this patent is extended or adjusted under 35 U.S.C. 154(b) by 47 days.

(21) Appl. No.: 09/920,649

(22) Filed: Aug. 3, 2001

(65) Prior Publication Data

US 2001/0055684 A1 Dec. 27, 2001

Related U.S. Application Data

(60) Division of application No. 09/354,662, filed on Jul. 16, 1999, now Pat. No. 6,299,962, which is a continuation-in-part of application No. 09/218,447, filed on Dec. 22, 1998, now abandoned.

(51) Int. Cl.[7] ............................................. B32B 31/00
(52) U.S. Cl. .................... 156/219; 156/242; 156/272.2; 156/277; 156/500; 156/553; 156/581
(58) Field of Search .................. 156/196, 209, 156/219, 242, 272.2, 277, 379.6, 284, 287, 500, 553, 580, 581, 583.1

(56) References Cited

U.S. PATENT DOCUMENTS

| | | |
|---|---|---|
| 2,002,527 A | 5/1935 | Dorogi et al. |
| 2,622,052 A | 12/1952 | Chandler |
| 2,693,221 A | 11/1954 | Lyijyen |
| 2,994,972 A | 8/1961 | Blair |
| 3,130,505 A | 4/1964 | Markevitch |
| 3,196,062 A | 7/1965 | Kristal |
| 3,256,131 A | 6/1966 | Koch et al. |
| 3,329,983 A | 7/1967 | Clamp |
| 3,397,418 A | 8/1968 | Steadman et al. |
| 3,427,673 A | 2/1969 | Freer |
| 3,431,601 A | 3/1969 | Lipscomb |

(List continued on next page.)

FOREIGN PATENT DOCUMENTS

| | | |
|---|---|---|
| DE | 2 239 702 | 2/1973 |
| DE | 2 235 819 | 2/1974 |
| GB | 1 305 202 | 1/1973 |
| GB | 2 131 354 | 6/1984 |
| WO | WO 90/03744 | 4/1990 |
| WO | WO 98/03333 | 1/1998 |

*Primary Examiner*—James Sells
(74) *Attorney, Agent, or Firm*—Sterne Kessler Goldstein & Fox PLLC

(57) ABSTRACT

The present invention is directed to an article of footwear and method for making the same, where the article of footwear has a minimal number of upper pieces. The method of the present invention is directed to a process for manufacturing an article of footwear having a single or multiple layer upper. Each layer of the upper according to the present invention is constructed of a one-piece upper material. At least the outer layer of the upper is molded utilizing an embossing tool according to the present invention, such that the desired appearance of the upper is embossed on the outer layer. Additionally, the improved shoe manufacturing process of the present invention may further comprise the step of decorating at least the outer layer of the upper, by screen printing, sublimation, large format ink jet printing, cold and hot peel transfers, fabric dyeing and/or multi-layered digital printing, allowing for multiple or different colorways to be created using a single base color upper material. The tool and process according to the present invention exhibit great flexibility with respect to aesthetics, construction and cost values, allowing for the creation of an unlimited variety of upper appearances with minimal retooling time and costs.

14 Claims, 13 Drawing Sheets

U.S. PATENT DOCUMENTS

| | | |
|---|---|---|
| 3,484,881 A | 12/1969 | Krieger |
| 3,504,450 A | 4/1970 | Steadman et al. |
| 3,583,081 A | 6/1971 | Hayashi |
| 3,605,294 A | 9/1971 | Cunningham et al. |
| 3,642,563 A | 2/1972 | Davis et al. |
| 3,739,414 A | 6/1973 | Skelham |
| 3,964,951 A | 6/1976 | Kremer et al. |
| 4,069,602 A | 1/1978 | Kremer et al. |
| 4,537,124 A * | 8/1985 | Graboyes .................... 101/28 |
| 4,562,607 A | 1/1986 | Trask |
| 4,598,487 A | 7/1986 | Misevich et al. |
| 4,599,810 A | 7/1986 | Sacre |
| 4,810,558 A | 3/1989 | Hornung et al. |
| 4,854,057 A | 8/1989 | Misevich et al. |
| 5,339,544 A | 8/1994 | Caberlotto |
| 5,494,431 A | 2/1996 | Tiefer |
| 5,586,398 A | 12/1996 | Carlson |
| 5,738,937 A | 4/1998 | Baychar |
| 6,077,472 A * | 6/2000 | Kataoka et al. ............. 264/338 |

* cited by examiner

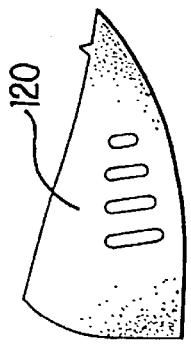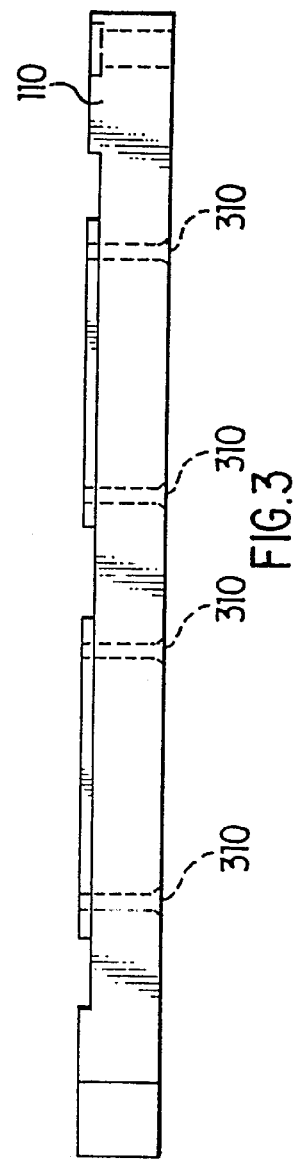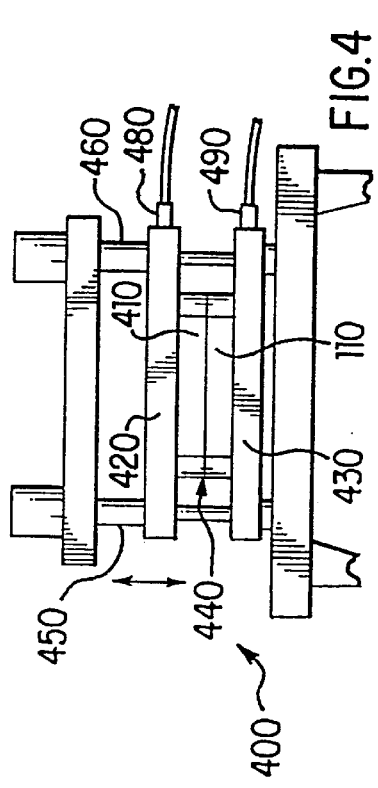

APPARATUS AND METHOD FOR MANUFACTURING A SHOE UPPER

This application is a divisional of U.S. patent application Ser. No. 09/354,662 filed Jul. 16, 1999, U.S. Pat. No. 6,299,962 which is a continuation-in-part of U.S. patent application Ser. No. 09/218,447 filed Dec. 22, 1998, now abandoned.

BACKGROUND OF THE INVENTION

1. Field of the Invention

The present invention relates to an apparatus for and method of manufacturing an article of footwear having a minimal number of upper pieces. More particularly, the present invention relates to an apparatus for and method of manufacturing an athletic shoe, walking shoe, brown shoe, dress shoe or boot wherein the number of pieces required to construct the footwear upper is minimized in relation to known manufacturing processes.

2. Related Art

Shoe manufacture is a labor intensive process. The typical shoe manufacturing process encompasses the steps of cutting the upper material, reducing the thickness of the joining edges ("skiving"), reducing the thickness of the upper pieces ("splitting"), cementing the interlining to the upper pieces ("interlining"), forming the eyelets, stitching the upper pieces together, shaping the upper over a last ("lasting") and cementing, molding or sewing the bottom of the shoes to the upper ("bottoming"). Modern footwear designs, particularly athletic shoe designs, require numerous upper pieces and complicated manufacturing steps, leading to high labor costs. Additionally, a new pattern is required and the manufacturing process must be retooled for every new design and style and for each desired shoe size.

In an effort to reduce labor costs, published PCT application WO 90/03744, incorporated herein by reference, describes the use of heat embossing to minimize the number of manufacturing steps. The published application describes a process of manufacturing shoe components, including an entire one-piece upper, in which a multi-layered upper material is heat embossed in a compression mold to reduce the thickness of the material, to close or seal the edges, to incorporate a functional design or pattern lines, and for strain management. After the embossing step, the backsides of the embossed upper material are stitched together by means of a back strip and the upper material is lasted and bottomed to form the completed shoe. This process greatly reduces the cutting and stitching steps and can eliminate the skiving, splitting and interlining steps of the typical shoe manufacturing process.

However, the shoe manufacturing process disclosed in the published PCT application does not greatly reduce the assembly time and costs associated with creating new patterns and retooling the manufacturing process for new designs, new styles and different shoe sizes. Rather, a new pattern and a new embossing mold must be created for each change in design and a separate embossing mold must be used for each desired shoe size. Similarly, numerous upper materials, in varying colors and textures must be kept in inventory to accommodate desired changes in style.

What is needed therefore is an improved labor-saving and time-saving method of shoe manufacture requiring less retooling time and reduced retooling costs. Further, what is needed is an improved shoe-manufacturing method in which the required upper material inventory is reduced. Still further, what is needed is a flexible, low cost shoe-manufacturing method that can be used to form a wide variety of shoe styles and designs.

SUMMARY OF THE INVENTION

The present invention is directed to a process for manufacturing an article of footwear having a single or multi-layer upper, wherein the number of pieces required to construct the footwear upper is minimized in relation to known manufacturing processes.

In one embodiment, the article of footwear manufactured has a three layer upper, having a minimal number of upper pieces. The process comprises the steps of molding a one-piece outer layer and a one-piece middle layer of the upper, with an embossing tool, described below, such that the desired appearance of the upper is embossed on the outer layer and such that the outer layer and middle layer are adhered to one another. Alternatively, the molding step can be omitted, if it is not desired to emboss the outer and middle layers, and the outer layer and middle layer can be adhered to each other by a conventional adhesive.

The ends of this one-piece outer layer/middle layer combination are then joined and stitched, using methods known to those skilled in the art, to form a conventional upper shape. A back strip of material having a pull tab may be sewn to the inside and/or outside of the outer layer/middle layer combination at the seam created by joining the ends.

A third, one-piece, inner layer is also formed into the shape of the footwear upper by joining and stitching the ends of the inner layer, such that the inner layer has a single seam. The inner layer is then inserted within the outer layer/middle layer construction and the inner layer is stitched to the middle layer to form the three layer upper of the present invention.

A combined tongue overlay and tongue pull tab, which may be molded in the embossing tool, described below, such that the desired appearance of the upper is embossed on this piece, may be stitched onto the tongue area of the three layer upper construction to further define the tongue shape and appearance. Eyelet stay reinforcers and lace loops may be disposed around the tongue area of the upper, as is conventional in the art. Similarly, a heel counter and heel collar may be disposed in the heel area of the upper, as is conventional in the art, to provide further comfort and support.

Finally, the three layer upper is lasted and the lasted upper is cemented, molded or sewn to the desired sole to complete the shoe construction. The upper can be decorated to create the final desired color and appearance, using a process such as screen printing, sublimation, large format ink jet printing, cold and hot peel transfers, fabric dyeing or multi-layered digital printing, either before or after the molding step, as discussed below.

Similar multi-layer one-piece upper constructions can be manufactured according to the present invention having two, four or more layers, as would be apparent to one of ordinary skill in the art, by either removing or adding one or more of the above mentioned layers.

Similarly, a single layer upper construction can be manufactured according to the present invention, having a one-piece upper material formed into the shape of the desired footwear upper. This material can be molded, as discussed below, in an embossing tool such that the desired appearance of the upper is embossed on the upper material. The ends of the upper material are stitched together using methods known in the art, and a back strip of material having a pull tab may be sewn to the inside and/or outside of the upper material at the seam where the ends are stitched together. A combined tongue overlay and tongue pull tab, which may be molded in the embossing tool, described below, such that the desired appearance of the upper is embossed on this piece as well, may be stitched onto the tongue area of the upper material to further define the tongue shape and appearance. Eyelet stay reinforcers and lace loops may be disposed around the tongue area of the upper material, as is conventional in the art. Similarly, a heel counter and heel collar may be disposed at the heel area of the upper material, as is conventional in the art, to provide further heel comfort and support. Finally, the upper material is lasted and the lasted upper is cemented, molded or sewn to the desired sole to complete the shoe construction. The upper material can be decorated to create the final desired color and appearance, using a process such as screen printing, sublimation, large format ink jet printing, cold and hot peel transfers, fabric dyeing or multi-layered digital printing, either before or after the molding step, as discussed below.

The present invention is also directed to an embossing tool for manufacturing a one-piece upper. The embossing tool can be utilized for more than one shoe size, model, design or style, and comprises an embossing mold and removable texture plates disposed in the embossing mold. Additionally the embossing mold may also comprise a combination of whole or partial plates, used for forming an upper, that can be interchanged within the embossing mold and/or within themselves. For example, an entire upper plate can be removed from the embossing mold and can be replaced with another upper plate design option. These upper plate design options can also have interchangeable inserts or texture plates for additional flexibility in the process. By interchanging the removable, texture plates disposed in the upper plate of the embossing mold, different textures and appearances for the upper can be created using the same basic embossing mold.

The present invention is also directed to a process for molding a one-piece upper material, utilizing the embossing tool according to the present invention. This improved manufacturing process includes the step of molding the upper material with an embossing tool having removable texture plates, such that the desired appearance of the upper is embossed on an upper material. The improved shoe manufacturing process according to the present invention greatly reduces the retooling time and costs associated with changes in the design and style of the upper. By interchanging the removable texture plates disposed in the embossing mold, different textures and appearances can be created using the same basic upper pattern, thereby, reducing retooling time and costs.

Additionally, the improved shoe manufacturing process of the present invention includes the step of decorating the upper material with the desired colorway onto a base color upper material before or after the molding step. The art of decorating the upper material includes, but is not limited to, screen printing, sublimation, large format ink jet printing, cold and hot peel transfers, fabric dyeing and multi-layered treatment, for example digital printing different layers of images on top of one another. Thus, the improved shoe manufacturing process according to the present invention allows for multiple or different colorways to be created with a single base color upper material, minimizing the need to order and have in inventory materials of different colors and reducing retooling time and costs, such that changes in decorative appearance can be quickly generated.

Therefore, the tool and process according to the present invention exhibit great flexibility with respect to aesthetics, construction and cost values, allowing for the creation of an unlimited variety of upper appearances in a number of sizes with minimal retooling time and costs. Additionally, the present invention reduces the costs and time associated with the shoe manufacturing process by reducing the number of upper pieces required and the amount of manual labor involved in the retooling process. By increasing the design flexibility of the manufacturing process, the present invention reduces the number of manufacturing steps and, thereby, reduces the amount of labor involved.

BRIEF DESCRIPTION OF THE FIGURES

The foregoing and other features and advantages of the invention will be apparent from the following, more particular description of a preferred embodiment of the invention, as illustrated in the accompanying drawings.

FIG. 1A is a plan view of a texture insert according to the present invention.

FIG. 3 is an elevational view of an embossing mold according to the present invention.

FIG. 4 is an elevational view of the compression molding apparatus of the present invention, including an embossing mold according to the present invention.

DETAILED DESCRIPTION OF THE PREFERRED EMBODIMENTS

The tool and process of the present invention minimize the amount of upper pieces required to assemble an upper for an article of footwear and exhibit great flexibility with respect to aesthetics, construction, and cost values.

A preferred embodiment of the present invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

While the following disclosure is directed to the manufacture of an athletic shoe, the disclosed embodiments are presented by way of example, and not limitation, and it will be apparent to persons skilled in the relevant art that various changes in form and detail can be made therein without departing from the spirit and scope of the invention. For example, the tool and process of the present invention can be utilized in the manufacture of uppers for various types of shoes, such as athletic shoes, walking shoes, brown shoes, dress shoes or boots. Depending on the desired effect, the tool and manufacturing process of the present invention can be used to mold a stand-alone component for shoe construction, such as a one-piece upper material, or a component that can be combined with a virtually unlimited variety of additional materials to compliment a shoe construction, such as a combined tongue overlay and tongue pull-tab, as discussed below.

The following disclosure is directed to the manufacture of an athletic shoe having a minimal number of upper pieces, thereby simplifying the manufacturing process. As discussed below, the present invention can be used to construct a single layer or multi-layered upper for an athletic shoe requiring the addition of only a minimal number of additional pieces, such as a backstrap (to connect the ends of the one-piece upper around the back of the heel of the shoe), a tongue overlay, and a sole, to construct an entire athletic shoe.

Figure 1B:
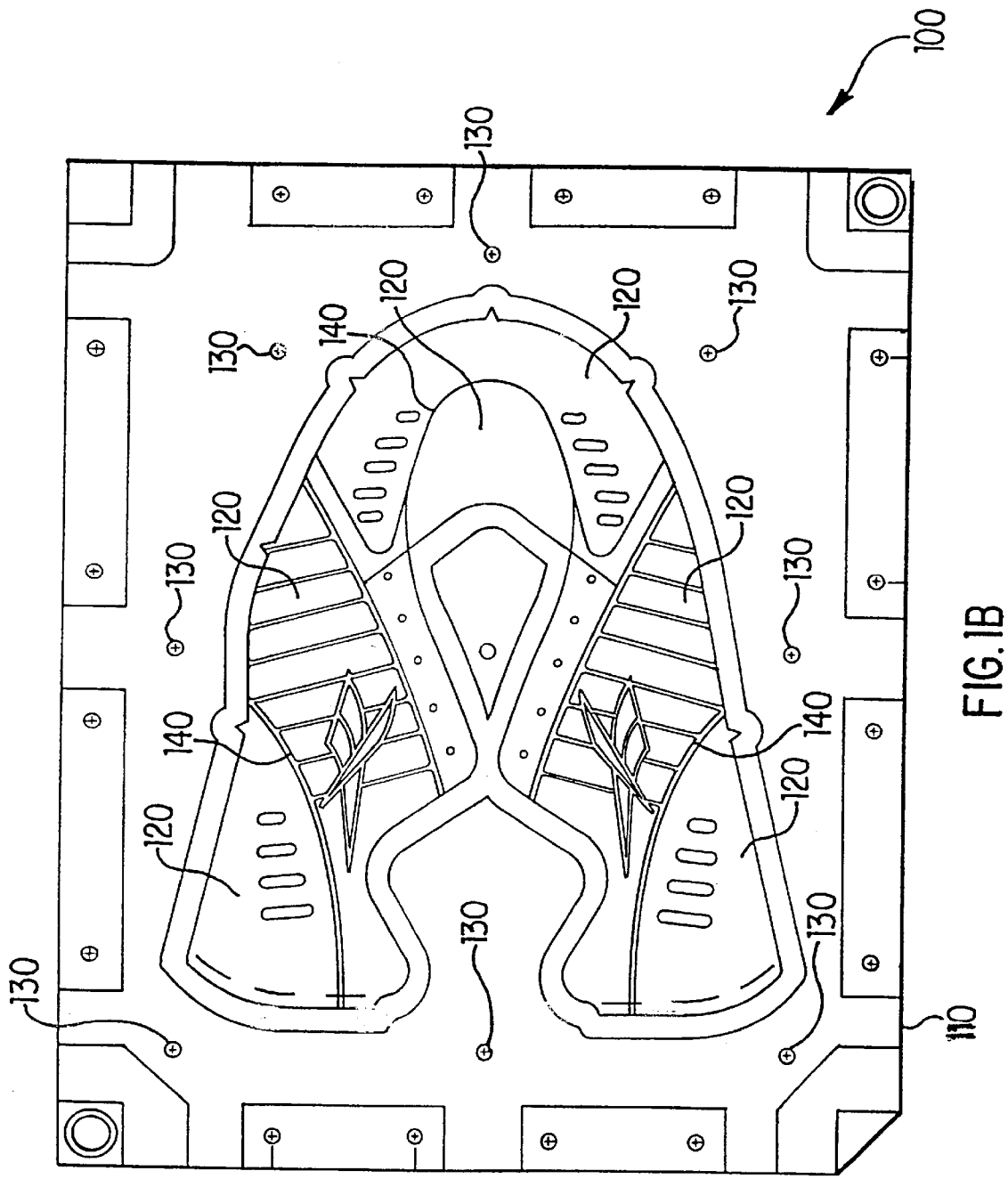
FIG. 1B is a plan view of a lower half of an embossing mold according to the present invention having a first set of removable texture inserts.

The manufacturing process according to the present invention is initiated with the generation of a desired upper pattern shape. The desired upper pattern shape can be created and manipulated using a CAD (computer aided design) system, or by other methods apparent to one skilled in the art of shoe design. The upper design is then used to make the embossing mold. In one embodiment, the upper design is fed into a CNC (computer numeric controlled) machine. The CNC machining process produces a tool 100 having an embossing mold 110, as shown in FIGS. 1B and 3. In the preferred embodiment, embossing mold 110 is made of aluminum. However, embossing mold 110 may be made of other materials, such as brass and magnesium or other heat and pressure tolerant type materials, as would be apparent to one of ordinary skill in the art.

Tool 100, which is used for manufacturing an upper of an article of footwear, for example an athletic shoe, according to the present invention comprises embossing mold 110 and a plurality of texture inserts 120 (as shown in FIG. 1A). Embossing mold 110 is designed to house a variety of removable and interchangeable texture inserts 120. In the preferred embodiment, texture inserts 120 are made of aluminum. However, texture inserts 120 may be made of other materials, such as brass and magnesium or other heat and pressure tolerant type materials, as would be apparent to one of ordinary skill in the art.

A different embossing mold 110 is required for each foot (i.e., left and right). However, if the medial and lateral sides of the upper pattern are identical, such that the upper pattern is symmetrical, the same embossing mold 110 can be used for both the right and left foot shoes. Alternatively, two embossing molds 110 can be hinged together to form a clam shell mold arrangement in which the hinged embossing molds 110 can mold two uppers (i.e. for the right and left foot shoes) simultaneously. In this embodiment, a separator material, such as a sheet of aluminum, brass, magnesium, or other heat and pressure tolerant material, as would be apparent to one skilled in the relevant art, preferably is placed between the two pieces of upper material when the mold halves are closed, such that the right and left uppers are not molded to each other during the molding process. The geometry shown in FIGS. 1B and 2 will make a one-piece upper for a left shoe. As such, a mirror image of the mold shown in FIGS. 1B and 2 would be used to mold the upper for a right shoe.

Embossing mold 110 can be used as a stand-alone tool for molding upper materials or it can incorporate desired texture inserts 120 to achieve an endless variety of molding effects. Additionally, the embossing mold may also comprise a combination of whole or partial upper plates that can be interchanged within the embossing mold and/or within themselves. For example, an entire upper plate can be removed from the embossing mold and replaced with another upper plate design option. These upper plate design options can also have interchangeable texture plates for additional flexibility in the process.

Figure 2:
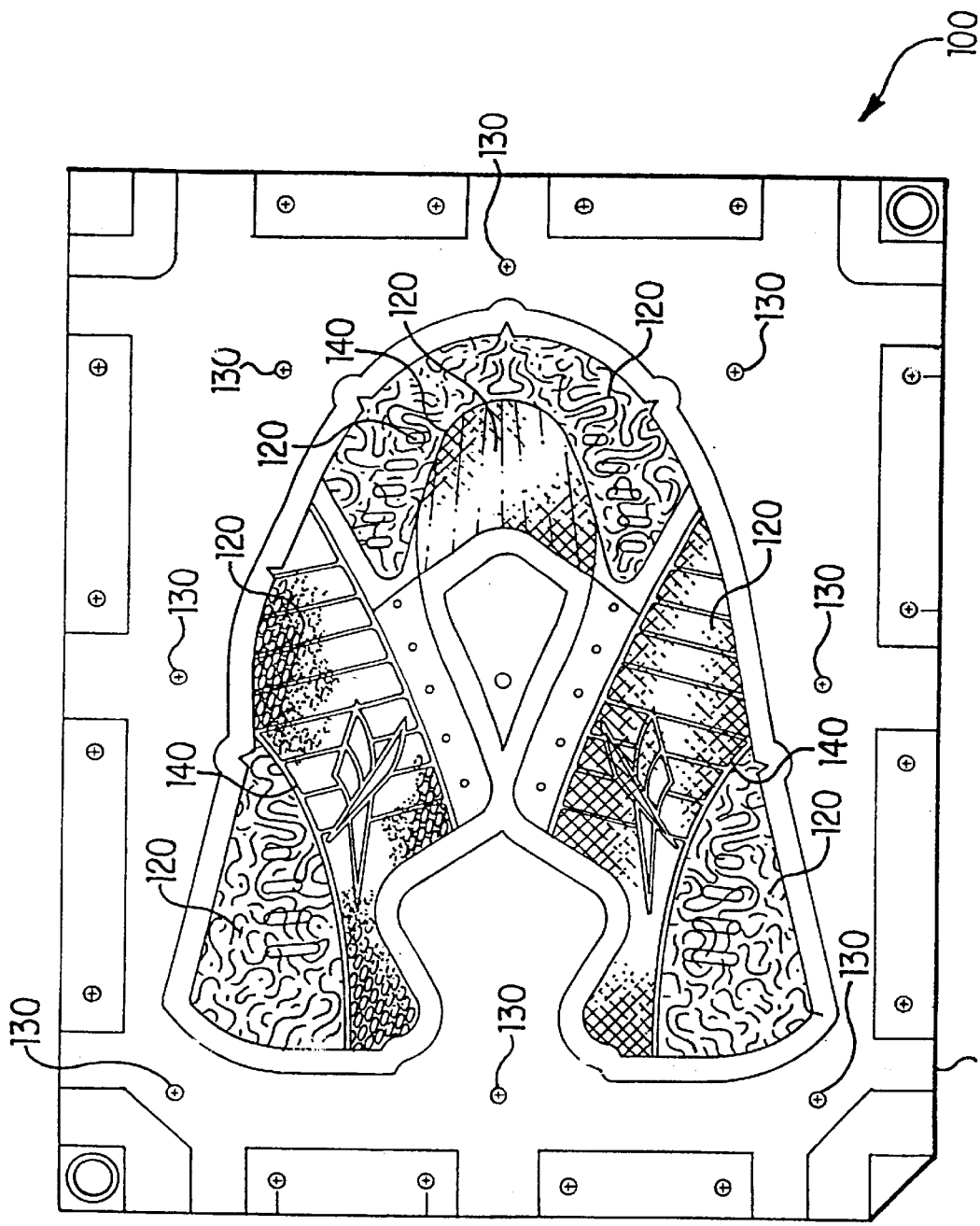
FIG. 2 is a plan view of the lower half of the embossing mold according to the present invention having a second set of removable texture inserts.

Individual texture inserts 120 are CNC machined to fit into desired locations within embossing mold 110. Mold 110 and texture inserts 120 can also be made using optional techniques such as photo etching or engraving, as would be apparent to one skilled in the art. FIG. 1B shows an empty embossing mold 110, that is an embossing mold 110 without any texture inserts 120 fitted within mold 110. As can be seen in FIG. 1B, embossing mold 110 is divided into a number of sections by pattern lines 140. As shown in FIG. 2, to achieve a desired style or texture appearance, texture inserts 120 are fit together like jigsaw puzzle pieces within the pattern lines 140 on embossing mold 110. Thus, embossing mold 110 and pattern lines 140 set out the basic pattern shape for the upper, and texture inserts 120 can be rearranged within pattern lines 140 of embossing mold 110 to create an unlimited variety of molded upper appearances. In one embodiment, texture inserts 120 are treated with textured surfaces to serve as embossing or debossing aids.

Figure 5:
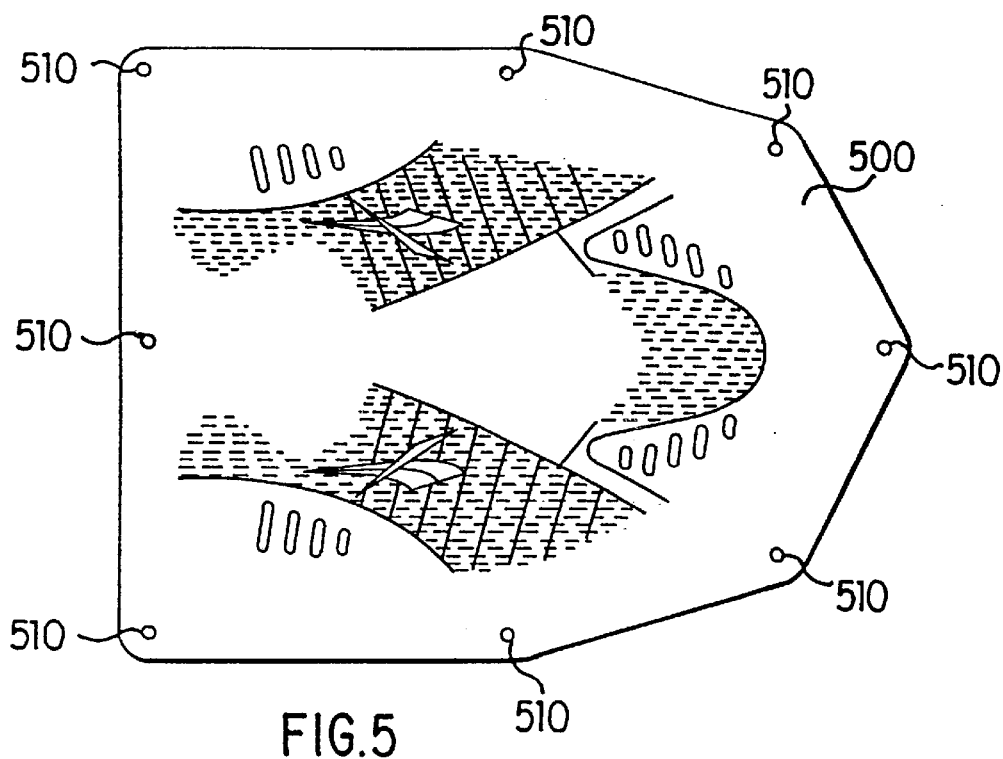
FIG. 5 is a plan view of an upper material decorated according to the present invention.

Embossing mold 110 is equipped with location pins 130 for positive and repeatable positioning of location holes 510 of upper material 500 (as shown in FIG. 5) to tool 100. Location pins 130 also serve as registration marks for single or multiple silk screening operations, discussed below, if applicable.

FIG. 3 shows an elevational view of embossing mold 110. As shown in FIG. 3, embossing mold 110 can be secured to tool 100 through screws 310 or the like. Alternative methods for securing embossing mold 110 and texture inserts 120 to tool 100 could also be employed, as would be apparent to those skilled in the relevant art.

Before or after molding upper material 500 with tool 100, color can be added to the upper manufacturing process of the present invention by screen printing upper material 500. FIG. 5 shows upper material 500 that has been screen printed with color prior to molding. The screen printing process allows for unlimited colorways and aesthetic possibilities to be created with a single base color upper material 500, eliminating the need to order and have in inventory materials of different colors. For example, the same white colored upper material 500 can be screen printed to produce a number of different appearances. For additional appearances, textured inks can be used in the screen printing process. The art of decorating the upper material is not limited to the screen printing process but can also include other decoration treatments, including but not limited to, sublimation, large format ink jet printing, cold and hot peel transfers, fabric dyeing, multi-layered treatment, for example, printing different layers of images on top of one another though a digital printing process, and other treatments known to those skilled in the art.

Selected upper material 500 can be molded with a desired texture and shape either by a heat emboss/compression molding (thermal compression molding) or RF welding, as discussed below. Alternatively, an ultrasonic welding process or other molding technique, known by those skilled in the art, could also be utilized. For example, in an ultrasonic welding process, ultrasonic vibrations create friction at the welding contact point and melt the materials together giving an end result similar to the RF welding described below. An advantage to the ultrasonic welding process would be that it lends itself to an embodiment of the invention in which upper material 500 could be roll fed, for example using a thermal calendaring process, through a modified version of embossing mold 110, allowing for improved mass production qualities. Embossing mold 110 would need to be modified to be useable on a roll feed mechanism, as would be apparent to those skilled in the relevant art. In another embodiment of the present invention, a vacuum assisted forming method could be used. For example, embossing mold 110 could be constructed with a plurality of holes drilled through mold 110. Then, material 500 is placed into the mold and a vacuum is used to suck air out of mold 110 through the holes drilled in mold 110, forcing material 500 to take the shape dictated by mold 110. In this embodiment, upper material 500 is preferably a thermoformable material. Alternatively, a porous material can be used in the vacuum assisted forming method, thereby obviating the need to drill holes in embossing mold 110.

A compression mold apparatus for implementing the present invention is shown in FIG. 4. Once embossing mold 110 has been fitted (if applicable) with textured inserts 120, the precut, preshrunk or stable upper material 500 is positioned, with the desired face down, onto location pins 130. Upper material 500 can be single or multiple layers and constructed of various materials such as leather, nylon, synthetic polymer products such as polyurethane, polyvinyl chloride (PVC), PETG, ethylene vinyl acetate (EVA), polyolefins with EVA content, polyurethane foam, styrenes, and various knit and woven fabrics or other materials used in the shoe construction and known to those skilled in the art. In the heat emboss/compression molding process, a silicone sheet (optional; not shown) is placed over the back (side facing operator) of the upper material 500 in embossing mold package 440. Embossing mold package 440 consists of embossing mold 110, selected texture inserts 120 and an upper material 500. A top half mold 410, as shown in FIG. 4, having a textured or untextured surface, may also be included in embossing mold package 440, but is not required. Alternative embodiments of embossing mold package 440 may also be used. For example, the positioning of embossing mold 110 and mold 410 may be reversed such that the upper half of the embossing mold package comprises embossing mold 110 and the lower half of the embossing mold package comprises mold 410. Also, embossing mold package 440 may be utilized with an upper half or a bottom half alone, as is described below. Embossing mold package 440 is placed onto press 400 between a heated top plate 420 and a heated bottom plate 430. Press 400 is comprised of hydraulic cylinders 450 and 460 that drive top plate 420 and bottom plate 430 against embossing mold package 440, disposed in between. Plates 420 and 430 contain heating elements 480 and 490 which heat plates 420 and 430 and, in turn, embossing mold package 440 to the desired temperature. Heat and pressure settings are variables in this process and are set as needed for each material/fabric requirement, as would be apparent to one skilled in the art.

A typical example of the manufacturing process according to the present invention utilizing heat emboss/compression molding wherein embossing mold package 440 does not include a top half mold 410 is as follows: a production-standard cycle time (load-press-unload), dependent on the material chosen, wherein five to seven metric tons of pressure are applied during each cycle; top plate 420 and bottom plate 430 of press 400 are heated to approximately 250 to 335° F.; embossing mold package is 440 removed from heated press plates 420 and 430 and the demolding of upper material 500 is accomplished while upper material 500, press plates 420 and 430 and embossing mold 110 are hot; the cycle is repeatable and maintains press heat. Pressurized cooling may be required to maintain production-standard cycle times.

In the RF welding process, embossing mold package 440 is prepared identical to that disclosed above for heat emboss/compression molding, except that a Teflon sheet (not shown) or other non-polar material may be added on top of or in place of the optional silicone sheet discussed above to cover upper material 500 in embossing mold package 440. An exemplary manufacturing process according to the present invention utilizing RF welding wherein mold package 440 does not include a top half mold 410 is as follows: a one minute cycle (load-weld-unload), having a preseal time of two seconds, a seal time of 20–30 seconds and a cool time of 20–30 seconds on a 20–30 KW RF welding machine. Molding time is decreased with the use of a turntable or sliding feed table. The actual KW power required is dependent on the area (in$^2$) of the tool surface and the type of material being welded and other factors known to those skilled in the art. If RF welding is used, upper material 500 is preferably a dipole polymer material and embossing mold 110 and texture inserts 120 are preferably photo etched.

Figure 6:
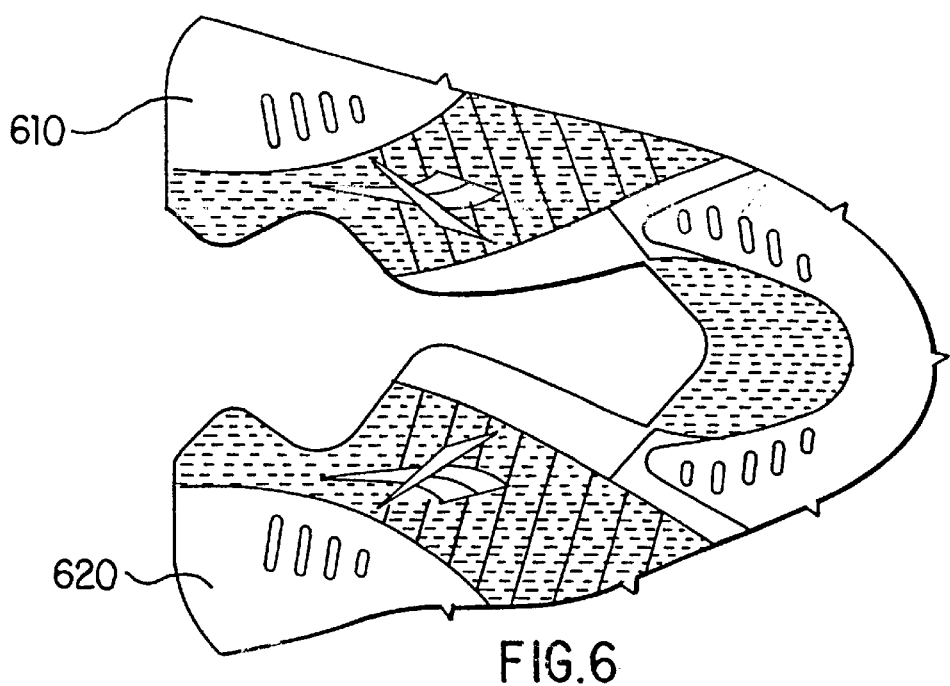
FIG. 6 is a plan view of an upper material decorated, molded and cut according to the present invention.

After the molding process is complete, upper material 500 is now ready to be die cut to the desired shape, as shown in FIG. 6 and incorporated into the actual upper construction. Alternative cutting techniques can also be used, such as laser cutting, water jet cutting, and reciprocating knife cutting, as would be apparent to those of skill in the relevant art.

Figure 7:
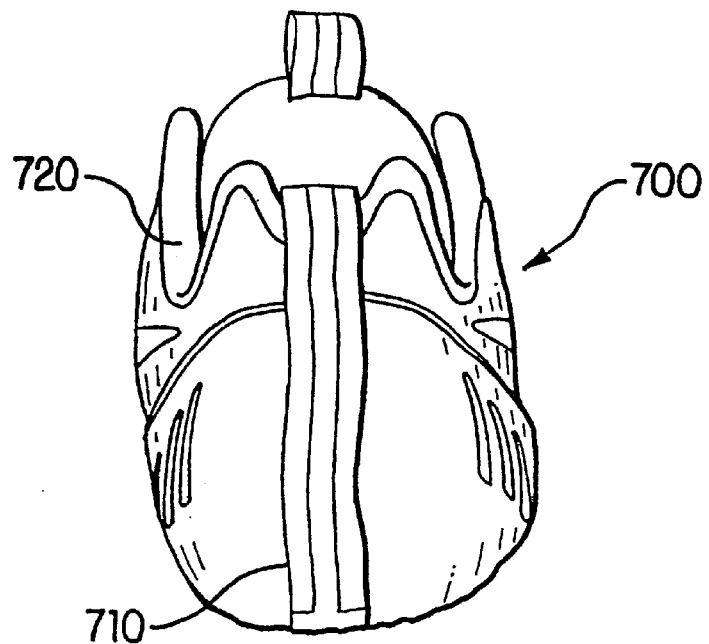
FIG. 7 is rear view of a completed shoe upper according to one embodiment of the present invention.
Figure 8:
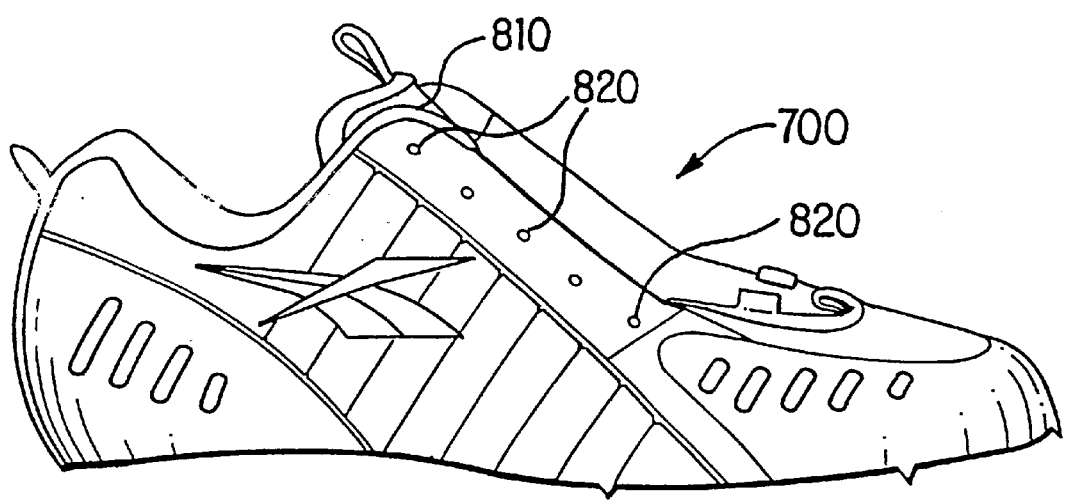
FIG. 8 is a side view of a completed shoe upper according to one embodiment of the present invention.
Figure 9:
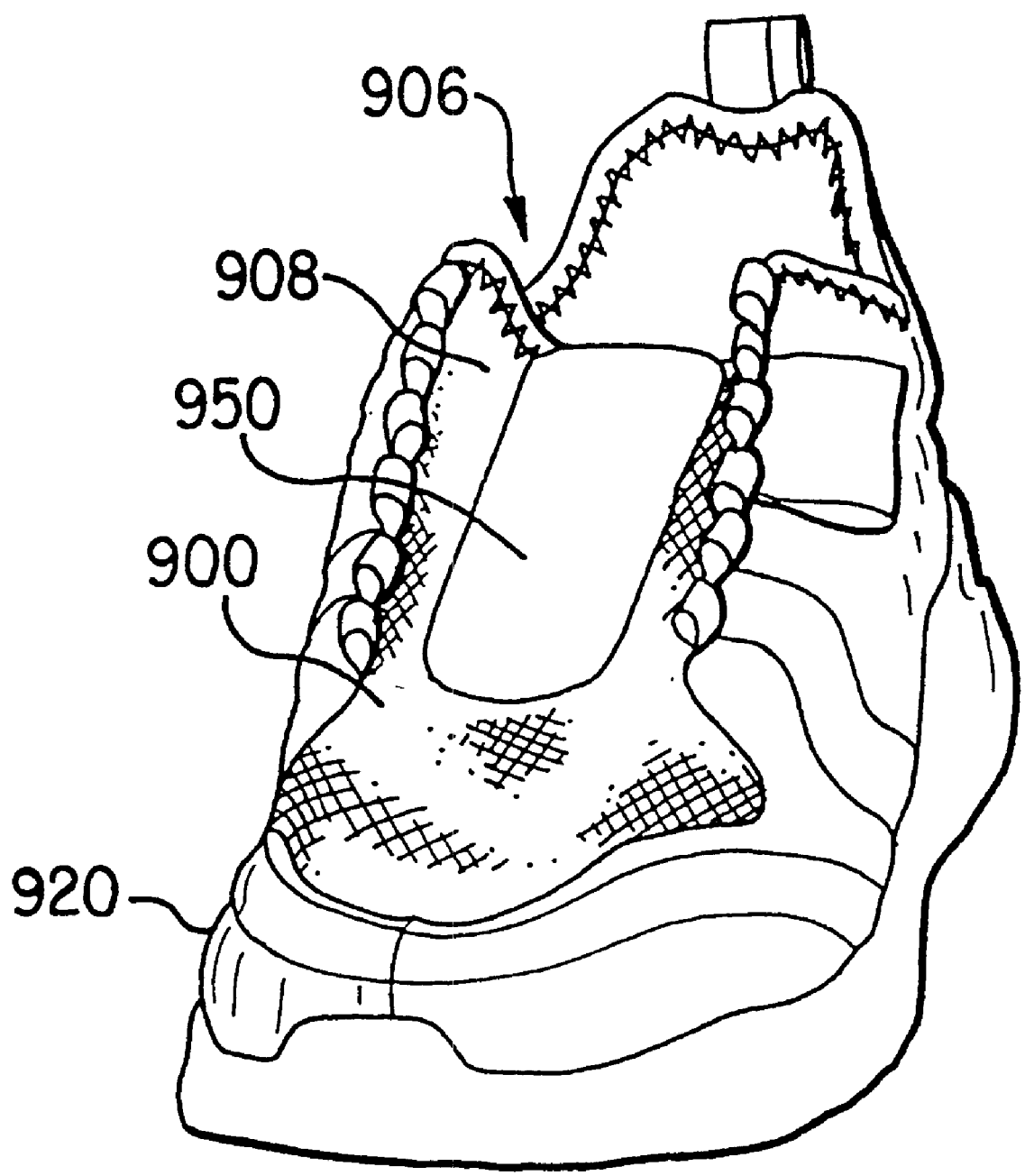
FIG. 9 is a perspective view of an alternate embodiment of a shoe made according to the present invention.
Figure 11:
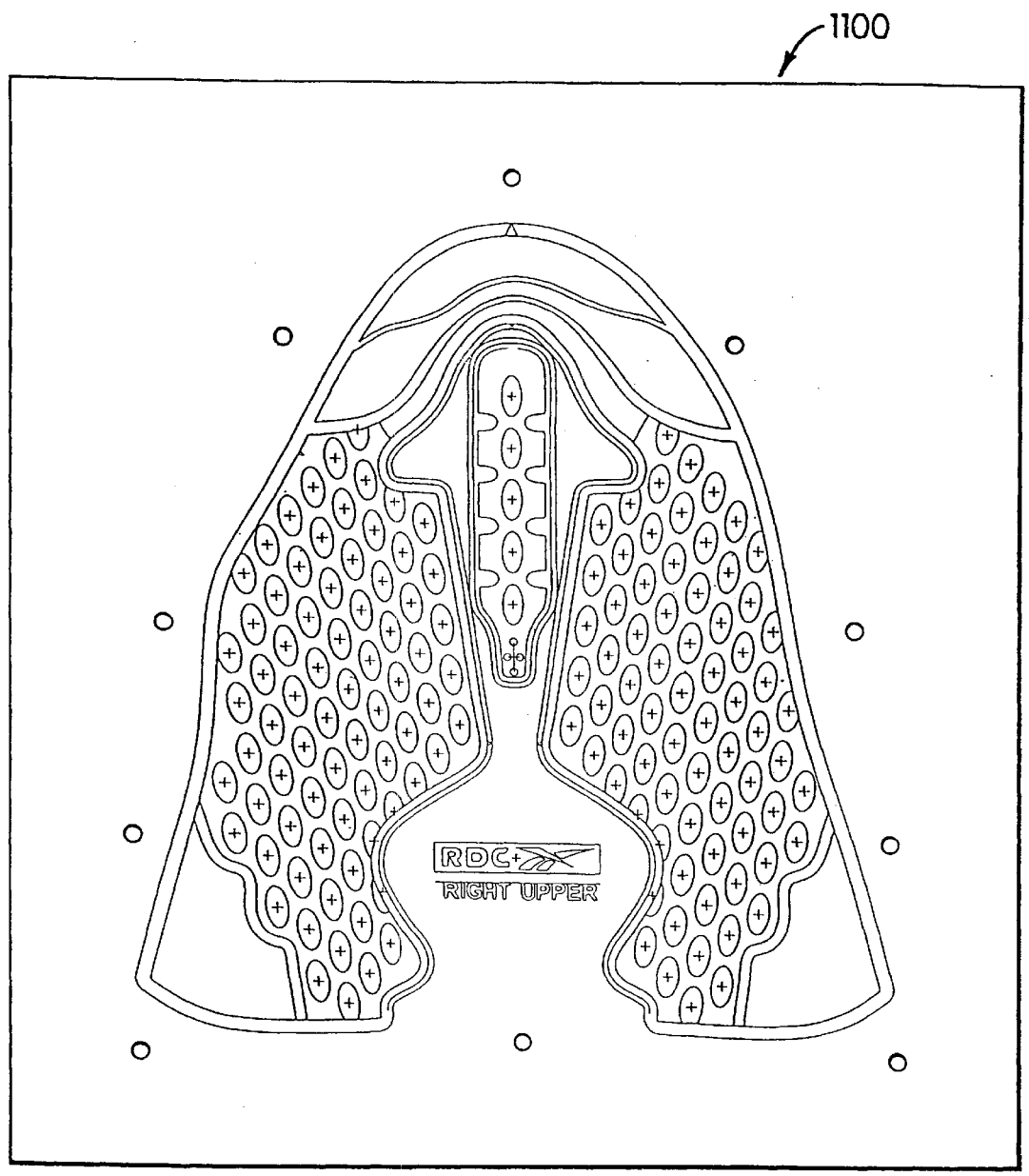
FIG. 11 is a plan view of a lower half of an embossing mold according to an alternate embodiment of the present invention.

In one embodiment, a one layer upper can be constructed according to the present invention. To form upper material 500 into the shape of a shoe upper 700, ends 610 and 620 of upper material 500 are stitched together using methods known in the art, as shown in FIGS. 7 and 8. A back strip 710 of material may be sewn to the inside and/or outside of upper material 500 at the seam where ends 610 and 620 are stitched together to form upper 700. Alternatively, if back strip 710 is not used, ends 610 and 620 of upper material 500 can be attached by tape sealing or by overlapping ends 610 and 620 and stitching, or other methods known to those skilled in the art. A tongue 810 can be sewn to upper material 500, as shown in FIG. 8. Alternatively, upper material 500 can be designed to include a bellows tongue arrangement (not shown for a one-layer construction), as described below with respect to FIG. 9. A combined tongue overlay and tongue pull-tab 950 can be sewn to upper material 500, as shown in FIG. 9. The design comprising this bellows tongue arrangement further reduces the number of upper pieces required. FIG. 11 shows an alternate embodiment of an embossing mold 1100, that is constructed as a unitary mold, without the use of texture inserts 120. Embossing mold 1100, discussed below, can be used to mold the embodiment of upper material 500 having a bellows tongue arrangement. Additionally, eyelets 820 may be disposed on upper material 500.

In the final step, upper 700 is shaped over a last (not shown) and upper 700, interlining 720 and a strobel sock (not shown) are stitched together. To add further flexibility, the amount of upper 700 that wraps around the bottom of the lasting board can be varied, so that the same embossing mold 110 can be used to make shoes of differing sizes. For example, an embossing mold 110 designed to produce a size 9 shoe can be used to manufacture a size 8½, 9 or 9½ shoe. Thus, using the apparatus of the present invention, an entire shoe can be constructed with a minimum number of parts and reduced labor.

In a second embodiment, only ten pattern pieces, shown in FIGS. 9A–9I, are used to make up the construction of a shoe according to the present invention, having a three-layer upper, as shown in FIG. 9. This is far less than the typical number of pattern pieces required for the construction of a conventional athletic shoe (typically around 20 to 30 pieces) and equal to or less than the number of pattern pieces typically required for a dress or brown shoe.

Figure 9A:
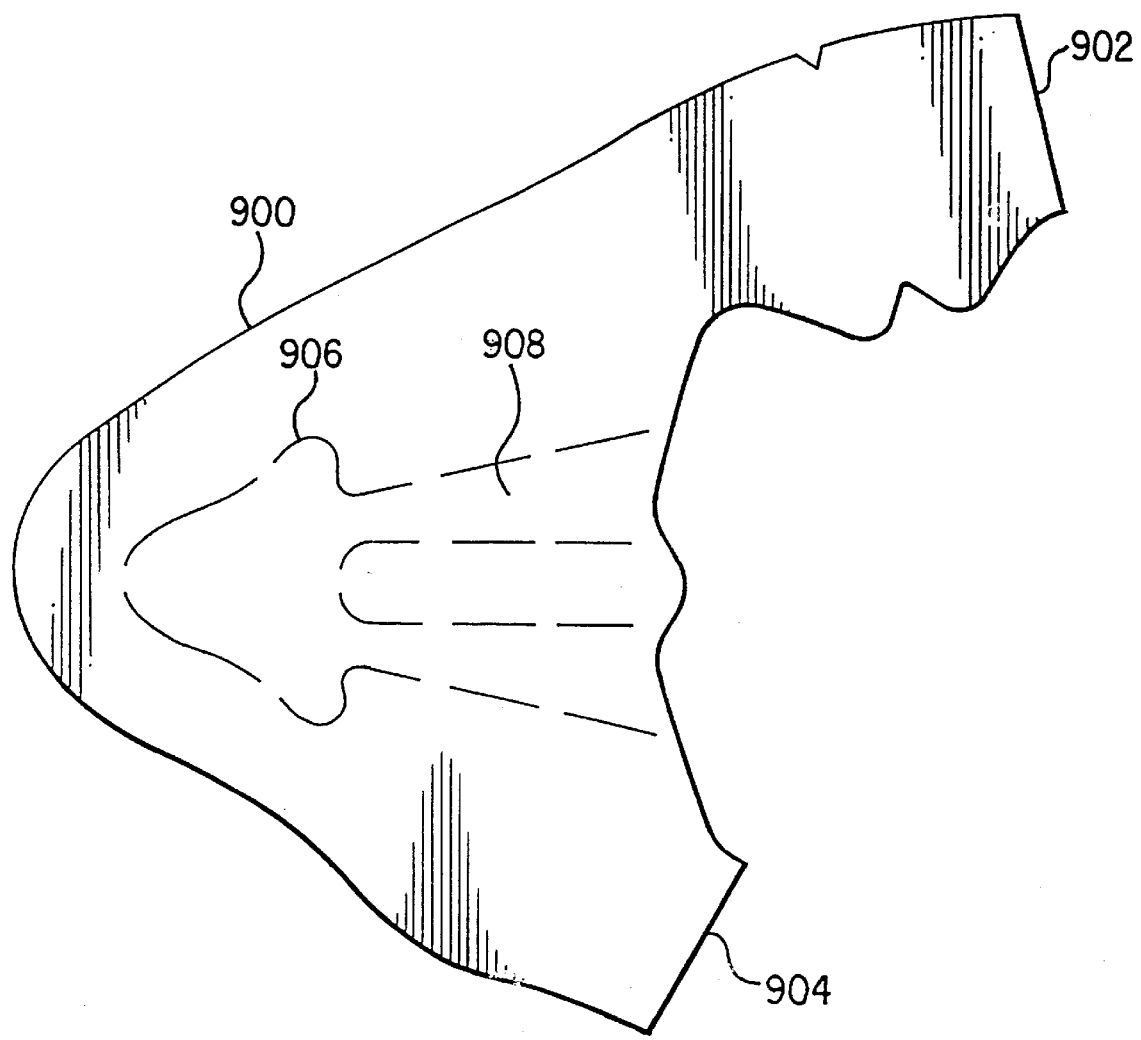
FIG. 9A is a plan view of inner layer material of the shoe of FIG. 9 according to the present invention.

The shoe construction of the second embodiment of the present invention, shown in FIGS. 9 and 10A–10D, consists of a three layer upper, having a one-piece inner layer 900, a one-piece middle layer 910 and one-piece outer layer 920. Inner layer 900, as shown in FIG. 9A, consists of a "seamless" bootie, having only two seams, one created by stitching together ends 902 and 904 of inner layer 900, and a second seam created during the lasting process, by the joining of strobel sock 930 to inner layer 900, as discussed below. If desired, the first seam of inner layer 900 can be positioned within the interior of the shoe, so that it is unexposed or unnoticeable to the wearer, creating the appearance of a "seamless" bootie. Inner layer 900 can be made of a triple mesh material, having moisture management characteristics, to wick away moisture from the foot, or other material known to those skilled in the relevant art, especially those materials known to be advantageous when used next to the skin of the wearer's foot.

Figure 10A:
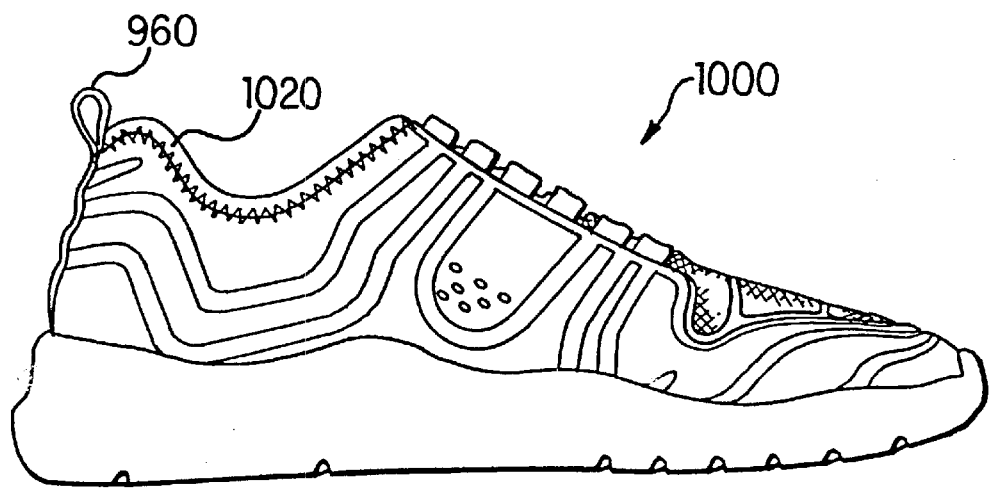
FIG. 10A is a side view of the shoe of FIG. 9 according to the present invention.
Figure 10B:
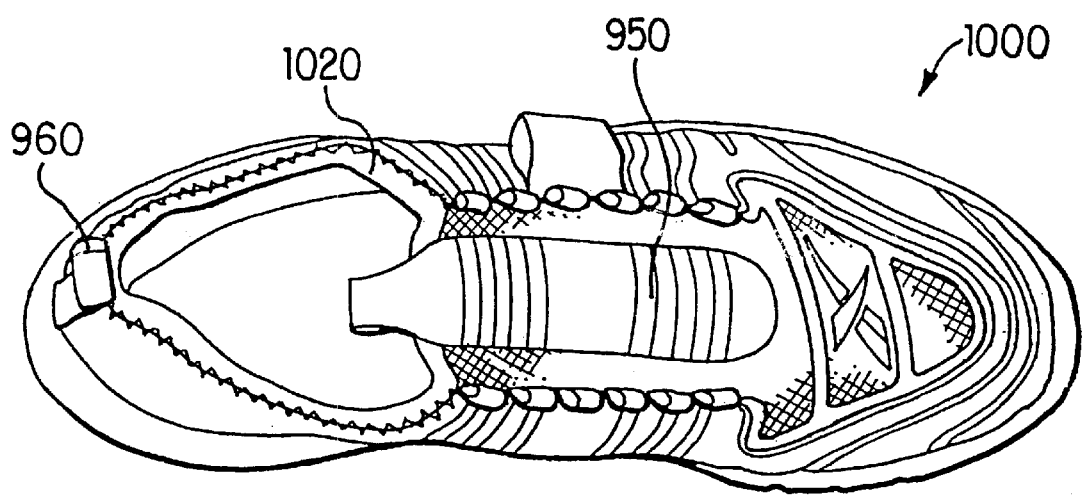
FIG. 10B is a plan view of the shoe of FIG. 9 according to the present invention.
Figure 10C:
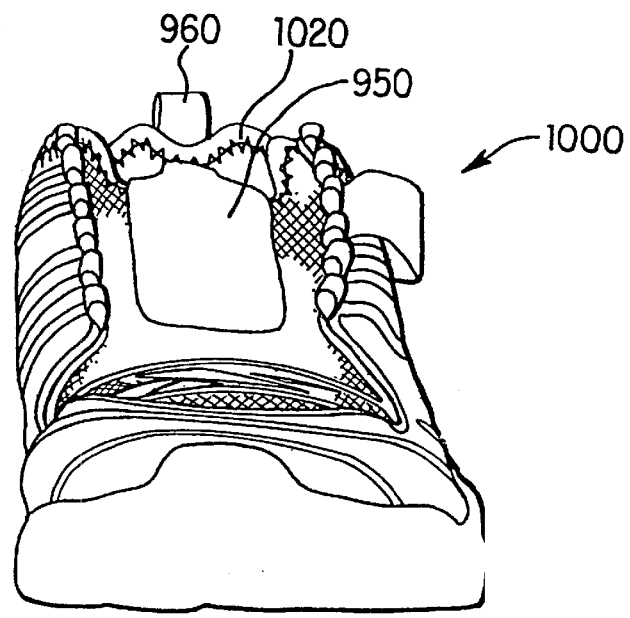
FIG. 10C is a front view of the shoe of FIG. 9 according to the present invention.

Inner layer 900 can also be provided with a bellows tongue arrangement 906, to further limit the number of pieces required, which, as in the embodiment shown in FIGS. 9, 10B and 10C, may be visible on the vamp of the shoe on either side of the tongue area of the shoe, such that seamless inner layer 900 continues around the top of the shoe, closing the vamp and tongue area off to prevent dirt from reaching inside the shoe. In particular, in this embodiment bellows tongue arrangement 906 has gussets 908 formed by the folding of inner layer 900, which are created without the need for additional stitching. This construction eliminates the need to sew a tongue onto the finished upper, as discussed with respect to the one layer upper embodiment above. If desired, the "seamless" bootie arrangement of inner layer 900 and in particular, the bellows tongue arrangement 906, can provide water resistant qualities for the article of footwear, by wrapping the entire foot in continuous one-piece inner layer 900. Additionally, the portions of inner layer 900 which are visible on the exterior of the shoe (for example, around the vamp and tongue areas of the shoe) can be treated with a water-proofing substance to further increase the water resistant qualities of the shoe.

Figure 9B:
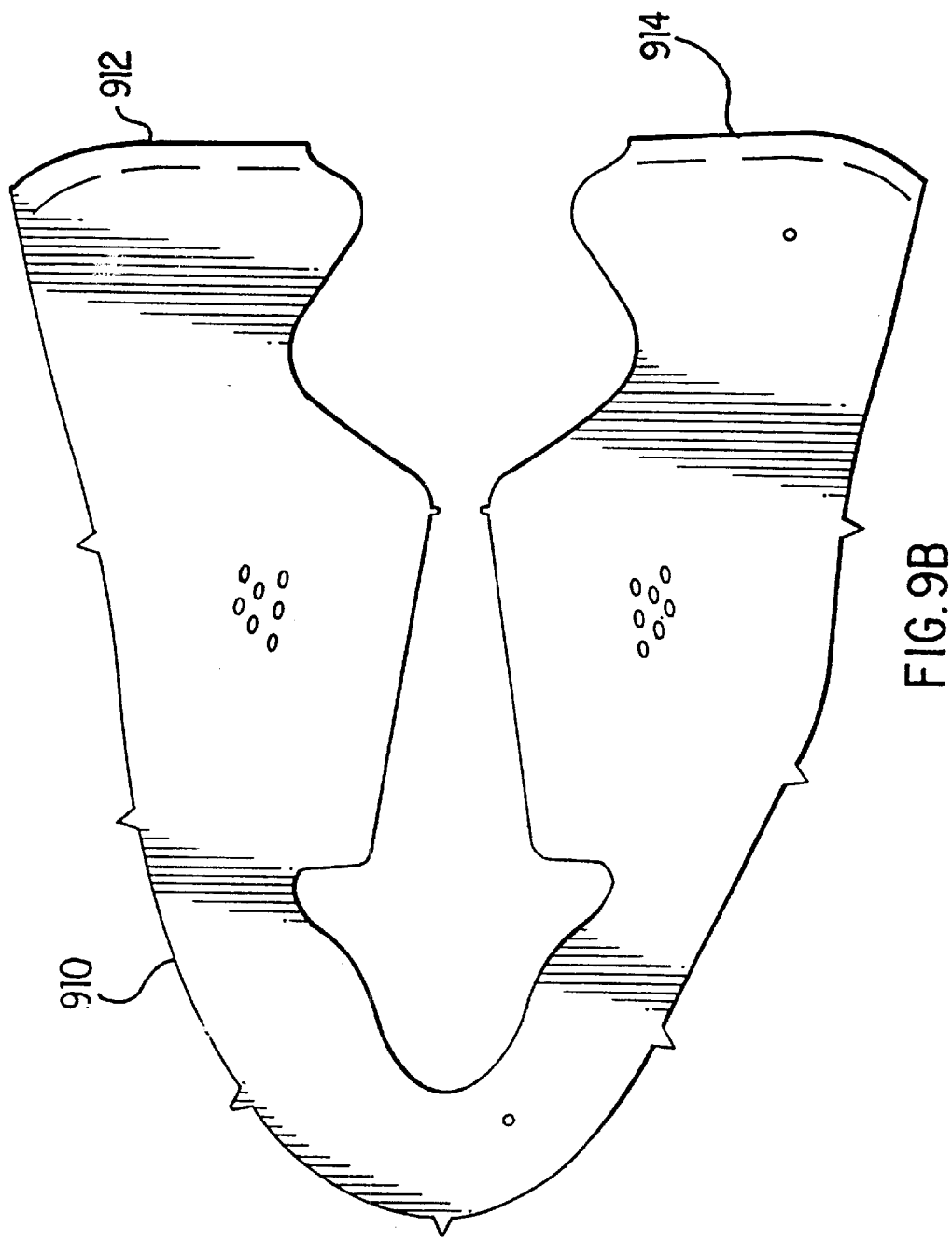
FIG. 9B is plan view of a middle layer material of the shoe of FIG. 9 according to the present invention.
Figure 9C:
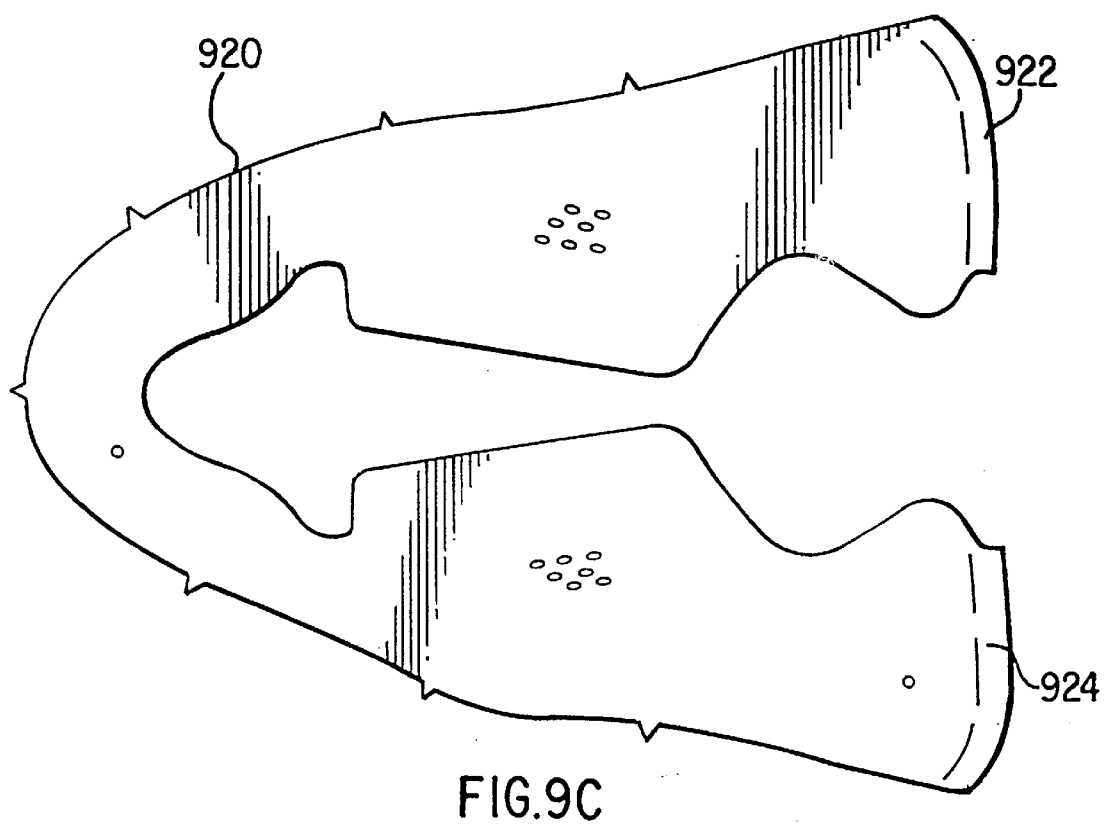
FIG. 9C is plan view of an outer layer material of the shoe of FIG. 9 according to the present invention.
Figure 9D:
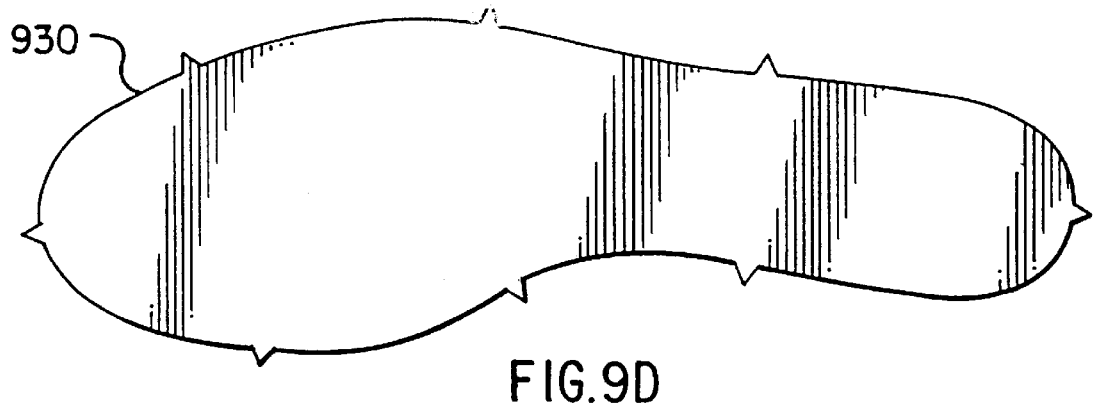
FIG. 9D is a plan view of a strobel sock material of the shoe of FIG. 9 according to the present invention.
Figure 9E:
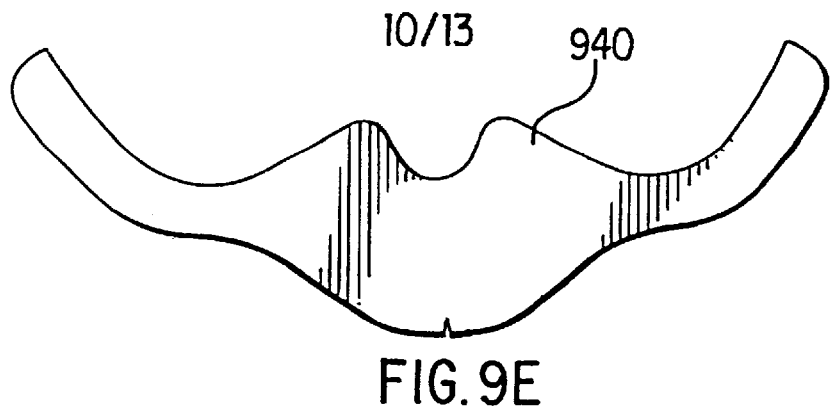
FIG. 9E is a plan view of a heel collar foam of the shoe of FIG. 9 according to the present invention.

Middle layer 910 and outer layer 920, as shown in FIGS. 9B and 9C, can be made using the same pattern piece, such that they are identical and overlap when placed one on top of the other. This construction allows middle layer 910 and outer layer 920 to be adhered together, either by an adhesive, such as glue, cement, a thermo-set adhesive, or other adhesives in the thermoplastic family; by a lamination technique known to those skilled in the relevant art, such as flame lamination; by stitching; or by compression sealing during the molding process. In one embodiment, middle layer 910 is made from a lofting material which has an anti-microbial treatment applied to it. Outer layer 920, as discussed above, can be any of a variety of materials, depending on the desired appearance and use. For additional heel support, a conventional heel counter (not shown), made from a rigid or semi-rigid material, can be disposed between inner layer 900 and middle layer 910. The heel counter may be made from a hard plastic, although it would be apparent to one skilled in the relevant art that a variety of materials could be used to form the heel counter. Additionally, heel collar 940, as shown in FIG. 9E, can be disposed between inner layer 900 and middle layer 910 around the heel of the shoe, to enhance comfort for the wearer. Alternatively, the heel counter may be disposed externally (on the outside of outer layer 920). In a two-layer embodiment, both the heel counter and heel collar may be disposed between inner layer 900 and outer layer 920. The advantages to the various placements of the heel counter would be apparent to one skilled in the relevant art.

Figure 9F:
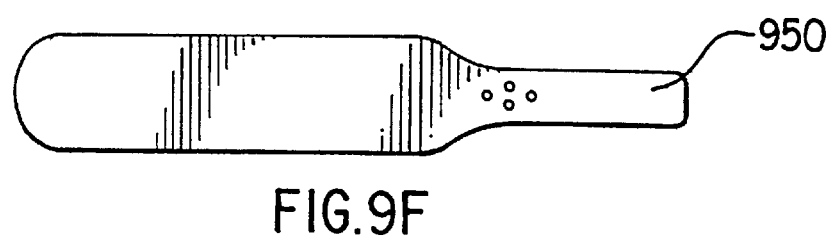
FIG. 9F is a plan view of a combined tongue overlay and tongue pull-tab of the shoe of FIG. 9 according to the present invention.
Figure 9G:
FIG. 9G is a plan view of a back strip with pull tab of the shoe of FIG. 9 according to the present invention.
Figure 9H:
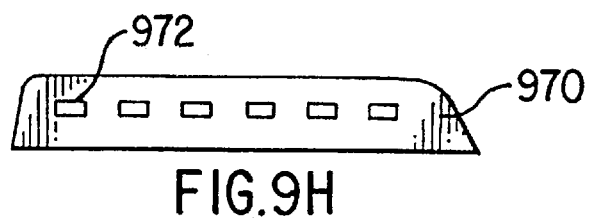
FIG. 9H is a plan view of an eyelet stay reinforcer of the shoe of FIG. 9 according to the present invention.
Figure 9I:
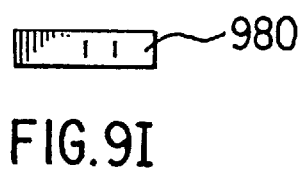
FIG. 9I is a plan view of a lace loop of the shoe of FIG. 9 according to the present invention.
Figure 10D:
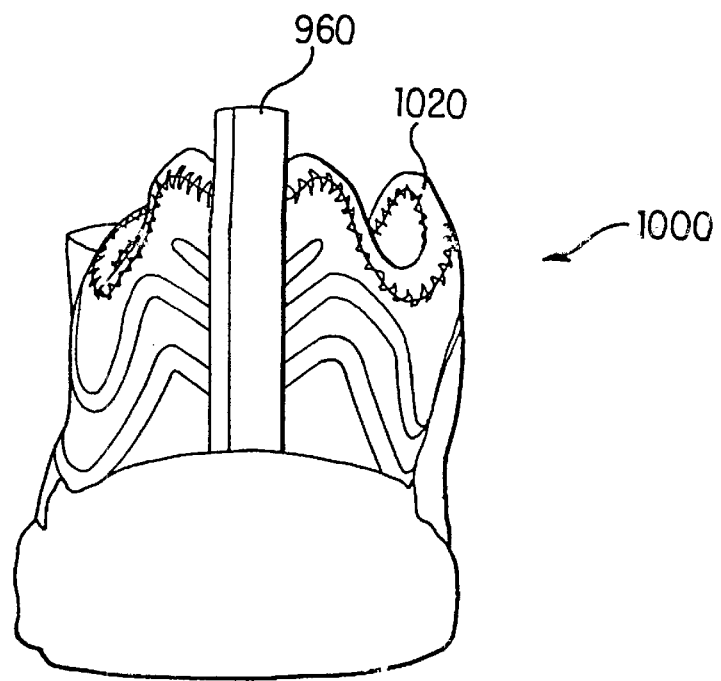
FIG. 10D is a rear view of the shoe of FIG. 9 according to the present invention.

Outer layer 920 and middle layer 910 are molded with the desired texture, using the embossing tool of the present invention, and thereby adhered to one another, as discussed above. Alternatively, outer layer 920 and middle layer 910 can be adhered to each other, using adhesives known to those skilled in the relevant art, prior to the molding step. Thus, in the three-layer construction, it is possible to adhere outer layer 920 and middle layer 910 and emboss simultaneously; it is possible to adhere outer layer 920 and middle layer 910 and then to emboss; or it is also possible to adhere outer layer 920 and middle layer 910 but not to emboss at all. Similarly, it is possible to use the molding step in the three layer construction for the joint purpose of adhering outer layer 920 and middle layer 910 and embossing, the sole purpose of adhering outer layer 920 and middle layer 910 (with no particular embossing pattern resulting), and the sole purpose of embossing only (i.e. after adhering has taken place). Then outer layer 920 and middle layer 910 are formed into the shape of a shoe upper 1000, as shown in FIGS. 10A–10D. In particular, ends 922 and 924 of outer layer 920 and ends 912 and 914 of middle layer 910 are stitched together using methods known in the art, as shown in FIG. 10. A back strip 960, as shown in FIG. 9G, of material having a pull tab, may be sewn to the outside of outer layer 920 or inside of middle layer 910 at the seam where ends 912, 914, 922, and 924 are stitched together to form upper 1000, as shown in FIG. 10D. Alternatively, if back strip 960 is not used ends 912, 914, 922 and 924 can be attached by tape sealing or by overlapping and stitching, or other methods known to those skilled in the relevant art. Inner layer 900 is then attached to the outer layer 920/middle layer 910 combination by stitching 1020, so that inner layer 900, middle layer 910 and outer layer 920 form the three layer upper embodiment of the present invention. In an alternate two layer embodiment, inner layer 900 is attached to outer layer 920. As discussed above, outer layer 920 and middle layer 910 can be embossed prior to forming the three layer upper to create the desired textured appearance and decorated using one of the aforementioned decorative processes. Additionally, in one embodiment, a combined tongue overlay and tongue pull-tab 950, as shown in FIG. 9F, can be molded in the embossing mold of the present invention, as discussed above, with a texture similar to outer layer 920. Embossing mold 1100, as shown in FIG. 11, is constructed so that middle layer 910, outer layer 920 and combined tongue overlay and tongue pull-tab 950 can be molded at the same time, by the same embossing mold. Combined tongue overlay and tongue pull-tab 950 is then stitched onto the end of bellows tongue 906, as shown in FIGS. 10B and 10C, to further define the shape and appearance of the tongue area of the shoe. Eyelet stay reinforcers 970, as shown in FIG. 9H, are disposed on either side of bellows tongue 906, as shown in FIG. 10C. Lace loops 980, as shown in FIG. 9I, are disposed in each eyelet 972 of eyelet stay reinforcers 970, as shown in FIG. 10C. In the final step, the three layer upper is shaped over a last (not shown) and upper 1000 and strobel sock 930 (shown in FIG. 9D) are stitched together. To add further flexibility to the shoe manufacturing process according to the present invention, the amount of upper 1000 that wraps around the bottom of the lasting board can be varied, so that the same embossing mold 1100 can be used to make shoes of differing sizes. For example, an embossing mold 1100 designed to produce a size 9 shoe can be used to manufacture a size 8½, 9 or 9½ shoe. While slip lasting is described above, board lasting, combination lasting, or string lasting could be used as well, depending on the desired stability and flexibility of the shoe, as would be apparent to one skilled in the relevant art. The lasted upper is cemented, molded or sewn to the desired sole to complete the shoe construction.

While a number of embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A tool for manufacturing an upper for a shoe comprising:
   an embossing mold; and
   a plurality of removable texture inserts disposed in said embossing mold, wherein said texture inserts serve as embossing aids.

2. A tool according to claim 1, wherein said tool is for manufacturing a one-piece upper.

3. A tool according to claim 1, wherein said tool is for manufacturing an upper component.

4. A tool according to claim 1, wherein said embossing mold is made of aluminum.

5. A tool according to claim 1, wherein said removable texture inserts are made of aluminum.

6. A tool according to claim 1, wherein said removable texture inserts are formed having textured surfaces and are interchangeable such that the molded appearance of said upper can be varied.

7. A tool according to claim 1, further comprising a plurality of location pins disposed on said embossing mold for aligning an upper material to said embossing mold.

8. A tool according to claim 1, wherein said tool can be used to emboss a screen printed upper material.

9. A tool according to claim 1, further comprising:
   an upper half mold removably disposed on top of said embossing mold;
   wherein said upper material can be disposed between said upper half mold and said embossing mold.

10. A method for manufacture of a shoe upper comprising:
    molding material with a tool comprising an embossing mold and a plurality of removable texture inserts, such that the desired appearance of said shoe upper is embossed on said material;
    joining the ends of said material to form said shoe upper.

11. A method according to claim 10, further comprising the step of screen printing color onto said material.

12. A method according to claim 11, wherein said screen printing step is performed prior to said molding step.

13. A method according to claim 10, wherein said molding step comprises heat emboss/compression molding.

14. A method according to claim 10, wherein said molding step comprises RF welding.

* * * * *